(12) United States Patent
Inuzuka et al.

(10) Patent No.: US 6,404,930 B2
(45) Date of Patent: *Jun. 11, 2002

(54) SIGNAL PROCESSING EQUIPMENT

(75) Inventors: Tatsuki Inuzuka, Hitachi; Toshiaki Nakamura, Hitachinaka; Kouzou Nakamura, Hitachiohta; Keisuke Nakashima, Hitachi, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,632

(22) PCT Filed: Apr. 7, 1995

(86) PCT No.: PCT/JP95/00688

§ 371 (c)(1),
(2), (4) Date: Oct. 7, 1997

(87) PCT Pub. No.: WO96/31974

PCT Pub. Date: Oct. 10, 1996

(51) Int. Cl.[7] .............................. G06K 9/36; H04N 1/40
(52) U.S. Cl. ....................................... 382/235; 358/448
(58) Field of Search ................................. 382/233, 234, 382/235, 236, 238, 239, 240, 241, 242, 243, 244, 245, 246, 248, 251, 252, 253; 345/501; 348/396, 157, 222, 399; 709/204; 368/9; 358/501, 401, 409, 426, 450, 448, 452, 453

(56) References Cited

U.S. PATENT DOCUMENTS

| | | | | | |
|---|---|---|---|---|---|
| 4,266,242 A | * | 5/1981 | McCoy | ...................... | 348/588 |
| 4,757,456 A | * | 7/1988 | Benghiat | ..................... | 705/412 |
| 5,126,838 A | * | 6/1992 | Ohsawa et al. | ............. | 358/500 |
| 5,282,055 A | * | 1/1994 | Suzuki | ........................ | 358/427 |
| 5,488,570 A | * | 1/1996 | Agarwal | ..................... | 345/501 |
| 5,552,824 A | * | 9/1996 | Deangelis et al. | ........... | 348/157 |

FOREIGN PATENT DOCUMENTS

| | | | | | |
|---|---|---|---|---|---|
| JP | 340560 A | * | 2/1991 | .......... | H04N/1/387 |
| JP | 487473 A | * | 3/1992 | ............ | H04N/1/41 |
| JP | 4150577 | * | 5/1992 | ............ | H04N/1/46 |
| JP | 4328956 | * | 11/1992 | ............ | H04N/1/38 |
| JP | 5-2639 A | * | 1/1993 | ........... | G06F/15/66 |
| JP | 6217106 | * | 8/1994 | .......... | H04N/1/387 |

* cited by examiner

Primary Examiner—Leo Boudreau
Assistant Examiner—Duy M. Dang
(74) Attorney, Agent, or Firm—Antonelli, Terry, Stout & Kraus, LLP

(57) ABSTRACT

An apparatus is provided for expanding, decompressing and editing signals, and particularly a signal processing equipment for printing or displaying images. The apparatus includes compression device for image data, storing device for storing the compression data, decompression device, and editing device for editing, using only signals for editing, wherein the transfer of the data between the device is executed using the compression data.

7 Claims, 18 Drawing Sheets

- MINIFIED DISPLAY OF IMAGES TO BE INSPECTED(A...J)

SUBSAMPLING COMPRESSED DATA
AND DISPLAYING INSPECTION DIAGRAM

SIGNAL PROCESSING EQUIPMENT

BACKGROUND OF THE INVENTION

This invention is concerned with an apparatus for effecting compression, decompression and editing of signals, and it particularly relates to an apparatus for printing and displaying images.

In laser beam printers, for example, the transfer of recording paper and the printing operation are executed at the same speed. Since data is output so as to match the picture signal sent from a host computer with the printing speed of a printing device, a memory for storing image data of at least one image is generally required. However, a memory having a huge capacity becomes necessary in order to realize a high picture quality with high resolution and high gradation, color, etc.

An example of a printing apparatus having a reduced memory capacity in order to eliminate the above problem is disclosed in a preprint of "Image compression encoding method optimized for a full-color printer", Japan Hardcopy '94 Fall Meeting, The 74th Conference of Japan Hardcopy for the Society of Electrophotography of Japan, Nobutaka Miyake, p. 13–16 (Dec. 2, 1994). According to this paper, the memory capacity for storing image data is reduced by using image compression encoding means combining discrete cosine transformation and quantization.

Further, as means for signal compression at a fixed compression rate, the LSI under the product name of FBTC (IMAGE DATA COMPRESSION & DECOMPRESSION LSI), having the type name of M65790FP, is described in the Mitsubishi Electric Corporation's data sheet. This LSI realizes a constant compression rate of 8/3 for black and white images so that the memory address at the time of the output of the compression data is converted to realize a processing of rotation and synthesis.

However, there are the following problems in the apparatuses disclosed in the above-mentioned publications:

(1) Regarding the apparatus in which image data is processed by using a compression method combining the discrete cosine transformation and quantization, the quantity of compressed data, that is, the compression rate changes in accordance with the patterns of the images. Therefore, the memory capacity must be designed, considering the worst compression rate.

(2) It is necessary to store image data of at least one page and rewrite the stored data so as to input page description languages, such as Post Script, as a command from the external apparatus, and to form and edit the image data. Since the compression rate changes in accordance with the pattern of the images, there is no regularity to the memory addresses at which the compression data is stored. Therefore, even if the image data to be rewritten is part of the image plane, all image planes must be decoded. Further, when the data of a part of the image is rewritten, the compression rate of the part changes and writing into the memory area can not be done.

(3) The picture quality degradation easily occurs due to compression processing of the image data. The Mitsubishi LSI has only the function of compressing and decompressing image data of every one image unit. And this device does not consider the editing function in order to rewrite the compression data stored. In addition, since the object of the Mitsubishi LSI is to produce a black and white image, signal processing for each color either must be executed in a time series, or several LSIs are necessary in order to carry out signal processing for the color image.

SUMMARY OF THE INVENTION

It is an object of the present invention to provide signal processing equipment which can reduce the memory capacity to be stored for forming or editing image data, solving the problems of the prior art.

A first feature of the present invention, in order to achieve the above object, is in the provision of signal processing equipment having compression means for converting signals into compression data on the basis of a compression procedure; storing means for storing the compression data; decompression means for restoring the compression data from the storing means in accordance with a decompression processing; and editing means for executing signal processing of the decompression signals; wherein the signals as the edit object are restored by using the decompression means from the storing means, and the processing result by the edit means is stored in the storing means by using the compression means.

Further, a second feature of the invention is in the provision of signal processing equipment having compression means for converting signals into compression data on the basis of a compression procedure; storing means for storing the compression data; decompression means for restoring the compression data from the storing means on the basis of a decompression procedure; and edit means for executing processing of the signals as the object stored in the storing means; wherein the signals to be the edited object are read out from the storing means, and the processing result by the edit means is stored in the storing means.

In addition, a third feature of the invention is in the provision of signal processing equipment having compression means for converting signals into compression data in accordance with a compression procedure; storing means for storing the compression data; decompression means for restoring the compression data from the storing means in accordance with a decompression procedure; edit means for executing signal processing of the decompressed signals; and a switch for changing the destination of the output of the signals restored by the decompression means; wherein the switch changes the destination of the outputs by the editing or the output of the signals.

The capacity of the memory for storing the image data is reduced, and, at the same time, the data transfer rate between the elements is reduced so that the formation and editing of the image data can be executed at a high speed, and so advantages not available in the conventional signal processing equipment can be obtained.

BRIEF DESCRIPTION OF THE DRAWINGS

FIG. 2A shows editing using input signals and signals stored in the storing means, and FIG. 2B shows execution of editing processing on the basis of an editing command.

FIG. 3A shows the construction of the apparatus for decompressing and transmitting the edited signals, and FIG. 3B shows the construction of the apparatus with the signal formation means for forming the compression data form.

FIG. 5A shows rewriting of the image data, and FIG. 5B shows rewriting of the compression data.

FIG. 6A shows the case of a fixed compression rate, and FIG. 6B shows the case of a variable compression rate.

FIG. 7A shows the data input of the pixel order and line order. FIG. 7B shows the data input of an image color-plane order. FIG. 7C shows the signal output (the image color-plane order) to a laser beam printer. FIG. 7D shows edit processing (overwriting of the image data). FIG. 7E shows edit processing (overwriting on the stored image data). FIG. 7F shows the expansion function (reduction of the picture quality degradation by memory duplication).

FIG. 12A shows the case of making one chip of the processor and the one image plane memory, and FIG. 12B shows the case of making one chip of the memory and the compression decompression means.

DESCRIPTION OF THE PREFERRED EMBODIMENTS

Figure 1A:
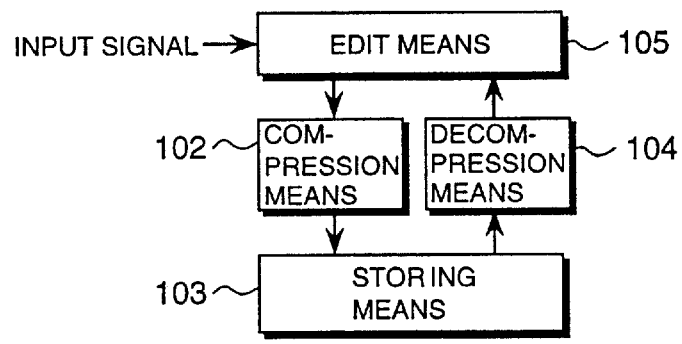
FIGS. 1A to 1C are block diagrams of examples of the most basic construction of the signal processing equipment of the present invention.
Figure 1B:
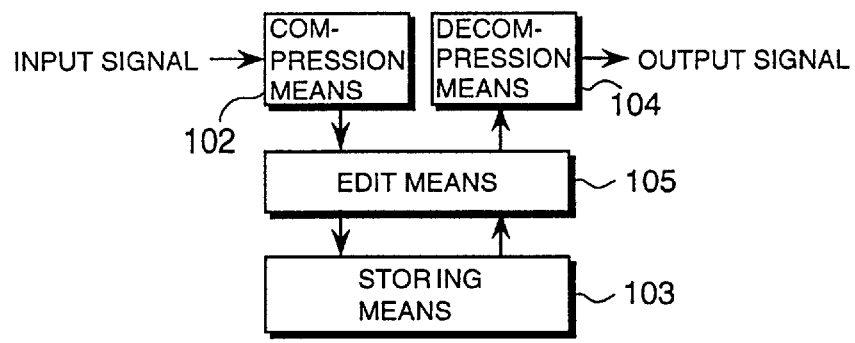
Figure 1C:
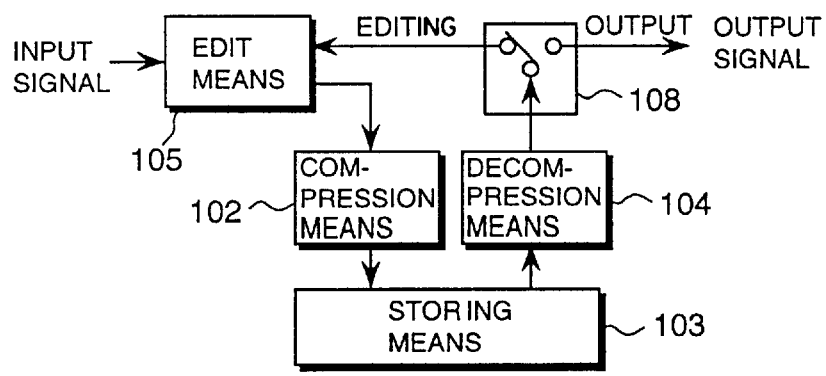

The most basic construction of examples of the signal processing equipment of the present invention is shown in FIGS. 1A to 1C, wherein input signals are converted into compression data by compression means 102, the compression data is stored in storing means 103, and decompression means 104 restores the compression data. And then, edit means 105 carries out edit processing by means of signals stored in the form of compression data in storing means 103 and of input signals supplied thereto. Here, there is the case that the input signals are signals which have the same characteristics as the signals stored as compression data or that the signals are a command representing the kind of signal processing for the signals stored as compression data. For example, the input signals are expressed by a combination of image data and a writing command for the image data, and the operation for re-writing a part of the signals stored as compression data is executed by interpreting both signals by use of edit means 105.

In another example, edit means 105 executes the input signal processing for effecting rotation, expansion, compression, etc., for the signals stored as compression data, using input signals. In any case, edit means 105 carries out the operation for correctly reading out signals as the edit object from the signals stored-as compression data.

In FIG. 1B, edit processing of the signals stored in the form of compression data in storing means 103 is carried out by using edit means 105, without restoration of the signals by the decompression means 104. This edit means does edit processing of the compression data on the basis of the signal processing of compression means 102. In the coding method using a fixed compression rate, for example, because the information relating to the data constitution and the data quantity of the compression data is already known, signals on the basis of the form of the compression data are generated on the basis of this information. The edit processing of the signals stored in the form of compression data in storing means 103 can be carried out in the form of compression data.

In FIG. 1C, the input signals are converted into compression data by compression means 102, and the compression data is stored in storing means 103. Decompression means 104 restores the compression data. And then, switch 108 selects whether the restored signals are output (output direction) or are transmitted to edit means 105 (edit direction). Edit means 105 carries out edit processing by using the signals and the input signal stored in the form of compression data in storing means 103. As was mentioned above, in the image data, for example, the edit means executes a signal processing to effect overwrite, re-writing, rotation and expansion, etc. by using the input signals. At the time of the signal output, it is not necessary to make the edit means 105 operate because the edit processing for the output signal is unnecessary. Switch 108 outputs the signal in the output direction. The compression means and the decompression means reduce redundant information on the basis of the characteristics of the signals, the purpose of using the signals, etc. With regard to the use purpose, there is the case where loss-less operation is required, and vice versa. Even if the use purpose is the same, there is the case where the redundancy is different according to the characteristics of the signal output unit. The present invention is not limited to a compression means and a decompression means of any specific configuration.

When the signal procedure of a fixed compression rate is used, the signals formed by the input means or by the formation means and the compression data of the storing means are associated with each other in accordance with specific rules on the basis of the signal processing for a fixed compression rate. In case of image data, for example, the location of the image and the memory address (storing means) can be transformed by simple operational expressions, a table, etc. on the basis of the rules. From this feature, for executing rewriting of the signals using the edit means, only the signals for rewriting are output from the storing means and can be input into the edit means.

Figure 2A:
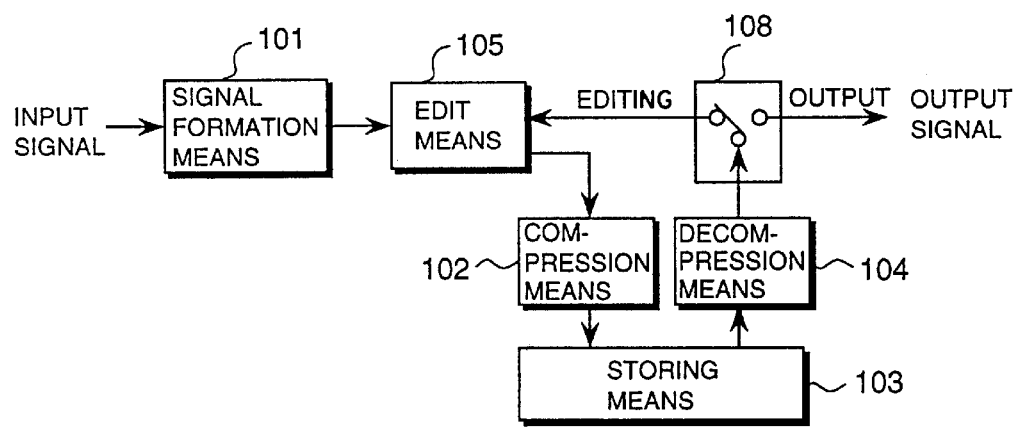
FIG. 2A and FIG. 2B are block diagrams of the signal processing equipment of the present invention.
Figure 2B:
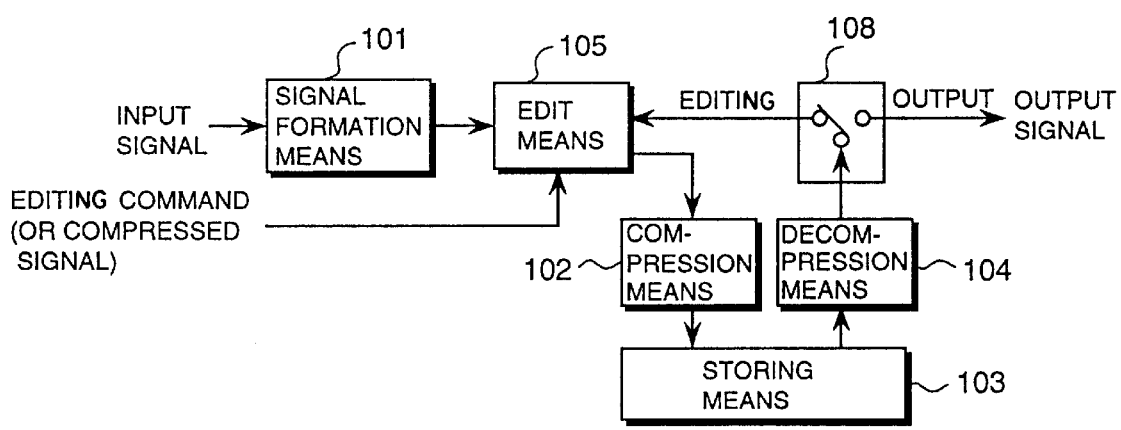

FIGS. 2A and 2B show examples of the apparatus that edits the signals stored in the storing means in the case where the input signals are commands based on the page description language. In FIG. 2A, in case of a command that instructs the signal formation on the basis of the page description language, the signals are generated by using signal formation means 101 based on the input signals. In FIG. 2B, in case of a command that calls for signal transformation on the basis of page description language, edit processing is executed by using both the signals formed by using signal formation means 101 and the signals which are stored in the form of compression data in storing means 103 and are restored by using decompression means 104. In FIGS. 2A and 2B relate to an example corresponding to the apparatus construction of FIG. 1C. It is needless to say that the apparatus construction of FIG. 1A or FIG. 1B can be used as well.

Figure 3A:
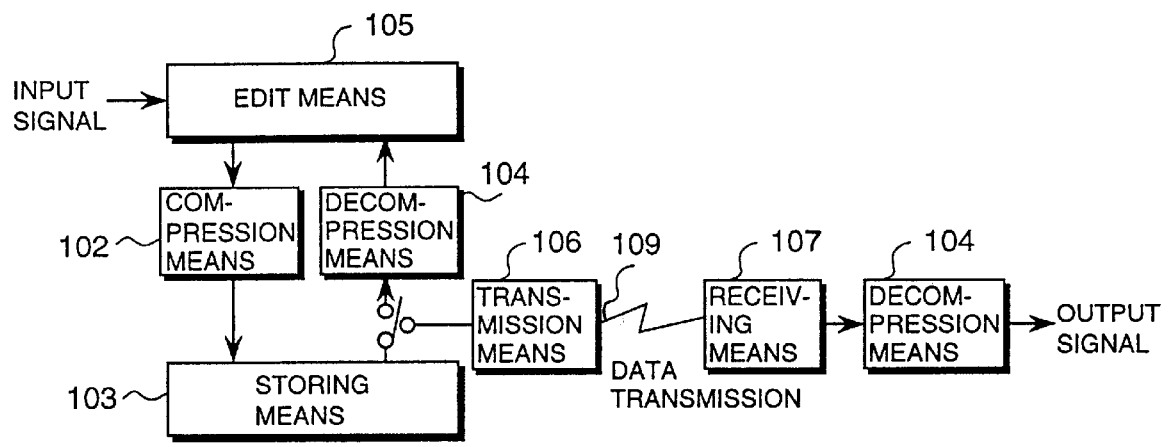
FIG. 3A and FIG. 3B are block diagrams of the signal processing equipment of the present invention.
Figure 3B:
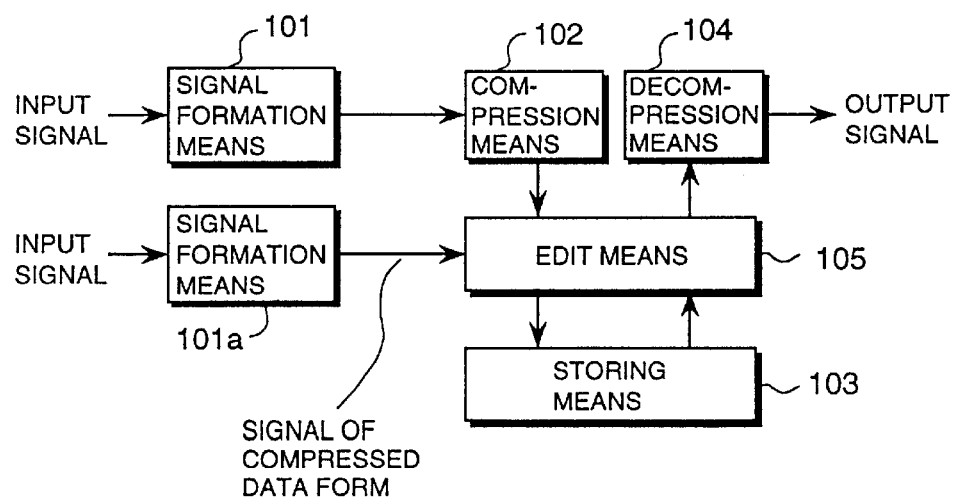

FIG. 3A shows an arrangement wherein an apparatus that actually uses signals restored by decompression means 104 is constituted by an apparatus having compression means 102, transmission means 106, receiving means 107 and network 109. Because the data transmission is carried out using compression data, a shortening of the transmission time can be realized. There is also an effect of reducing the cost of the receiving apparatus, because storing means 103 is not necessary on the receiver side. FIG. 3B shows an example wherein signal formation means 1a generates signals of the compression data form. As was explained above, in the case of a coding method using a fixed compression rate, because the information relating to the data construction and the data quantity of the compression data is known in advance, signals in a compression data form can be generated on this basis of the information. As a result, because signal processing to effect data compression need not be done, effects such as shortening of the signal processing time can be realized.

In the above example, the coding method for compressing data with a fixed compression rate can be used as a compression and decompression means. In the case of color image signals, for example, in order to realize a fixed compression rate, it is possible to employ means for dividing an image into blocks constituted by several pixels and for converting the signals in the blocks into selection signals representing color signals of two kinds or so and a difference (image-resolution) among the signals.

On the other hand, the compression method using a variable compression rate can be used. But, in the case of a variable compression rate, it is necessary to provide means for associating the memory address of the index and the compression data representing the location of the image at the time of the compression of the image data. Rewriting of the image data at a specific place is carried out by referring to the means for associating and by restoration of the compression data in the storing means. As the data quantity changes, when the image data after rewriting is compressed, signals sometimes cannot be stored in the former place. Therefore, writing is done to the empty part of the storing means, and the memory address is newly set to the means for associating. If this procedure is used, while the compression means using a variable compression rate can be used, the storing means control method becomes complicated. If attention is paid to the decline of the processing speed, the above compression method can be used without problem.

Yet, as the compression method, a block approximation code (Block Truncation Coding), Huffman code, Arithmetic Coding and LZ (Lempel, Ziv), LZW code which is its improved type, etc. can be used. The present invention is not limited to a specific compression method. While, as a pretreatment of the compression, processing such as calculation of the finite difference value, the orthogonal transformation, wavelet transformation, histogram detection, edge detection, the range separation, the color transformation and the block approximation can be used, the present invention is not limited thereto.

As described above, the present invention realizes reduction of the capacity of the storing means and high speed of signal processing by using a compression means, a decompression means, storing means and an edit means. From the viewpoint of signal flow, the construction for processing and transmitting signals as compression data can be realized, except for the input and output of signals. Even in the case where the signals must be processed in the form of the original data, only the signals as the object of processing are handled as original data. Further, as the storing means 103, apparatuses such as semiconductor memories, flash type memories, a hard disc apparatus, optical magnetic discs, etc. can be used.

An example of the present invention will be explained by using the apparatus described below.

(1) A Printer Controller

The printer controller inputs commands, such as the page description language from the host computer, and the image data formed and edited on the basis of the commands are output to the printing means, called a printer engine. There is also a construction by which the formation and editing of the image data are executed on the host computer side, and then the image data is transmitted according to the scanning order of the printer engine. In this case, there is a problem that the data transfer time becomes longer, but this example can be presumed as the host computer performs the function of the printer controller.

Here, in the printer controller it is normally difficult to carry out formation and editing of the image data in synchronism with the operation of the printer engine, from the viewpoint of the signal processing speed. Therefore, in general, means for storing the image data for at least one image plane is provided in the printer controller. Especially, in an apparatus that executes the printing of one image plane at a constant speed, like a laser beam printer, delay of the formation and editing of the image data is not allowed, and therefore, it is desirable that all image data for one image plane is formed, edited and stored in advance.

Thus, among means for constituting the printer controller, the formation means, the edit means and the storing means for the image data have been considered necessary. In addition, signal transformation means was provided in order to improve the picture quality. But, as the improvement of picture quality reproduction ability in the printer engine increases, the printing image has changed from black and white to multi-color and further to full-color, and so the pixel density becomes higher. As a result, the capacity of the image data constituting one image plane has become remarkably large.

This has created the following problems in the printer controller.

(a) The memory cost portion of the apparatus cost increases.

(b) The amount of image data to be edited becomes huge, and so the time required for signal processing becomes longer.

(c) The time required for the data transfer among various means increases.

Figure 4A:
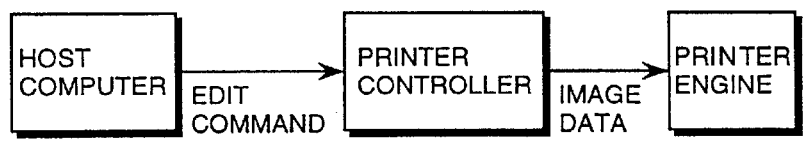
FIG. 4A is a block diagram of the printer.
Figure 4B:
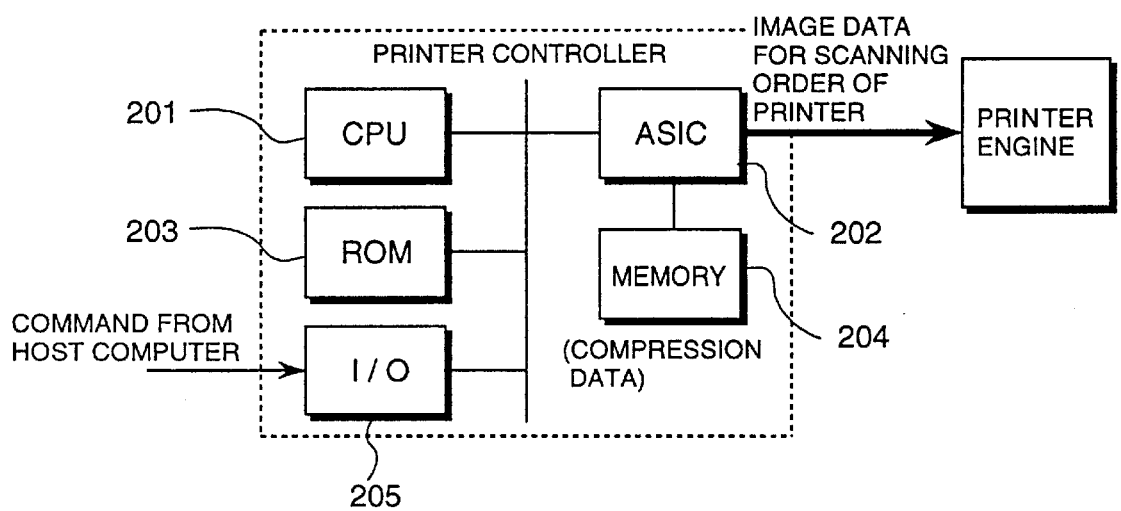
FIG. 4B and FIG. 4C are block diagrams of examples of the printer controller.
Figure 4C:
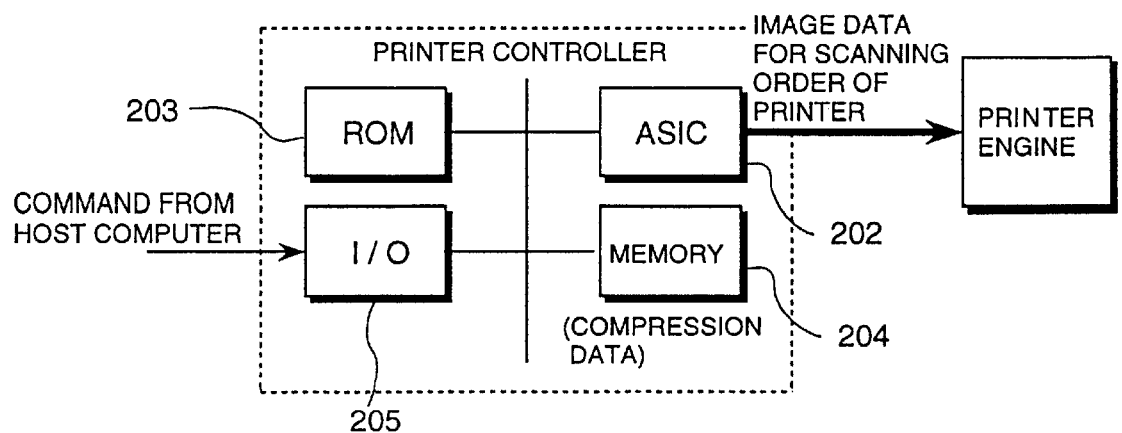

In order to solve the above problems, an example of the present invention will be explained. FIG. 4A shows the basic construction of the printer. FIG. 4B shows an example of the construction of the printer controller. FIG. 4C shows another example of the construction of the printer controller.

Image data is formed and edited using CPU 201 or ASIC (Application Specific IC) 202, based on commands input using input/output means 205 from the host computer. The image data is converted into compression data and is stored in memory 204. And then, in synchronism with the timing of the printing means of the printer engine, a signal is output in order. CPU 201 takes the program data from ROM (Read Only Memory) 203, which stores the operating program. Signal processing of the formation, the editing, etc. of the image data is executed by using either CPU 201 or ASIC 202 or both. Memory 204 has sufficient memory capacity that image data for at least one image plane can be stored as compression data. This leads to execution of the formation or editing of the image data and to the matching of the data transfer rate and with the printer engine.

Figure 5A:
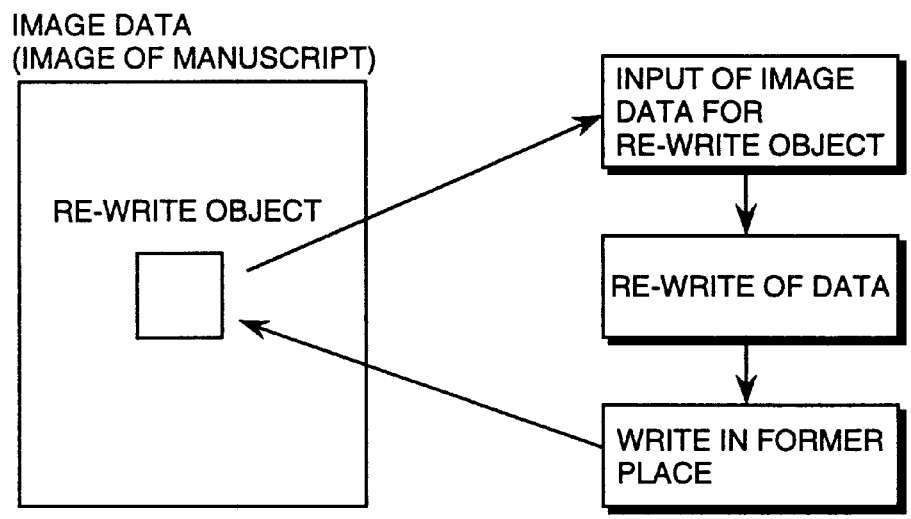
FIG. 5A and FIG. 5B are diagrams which show the edit processing of image data.
Figure 5B:
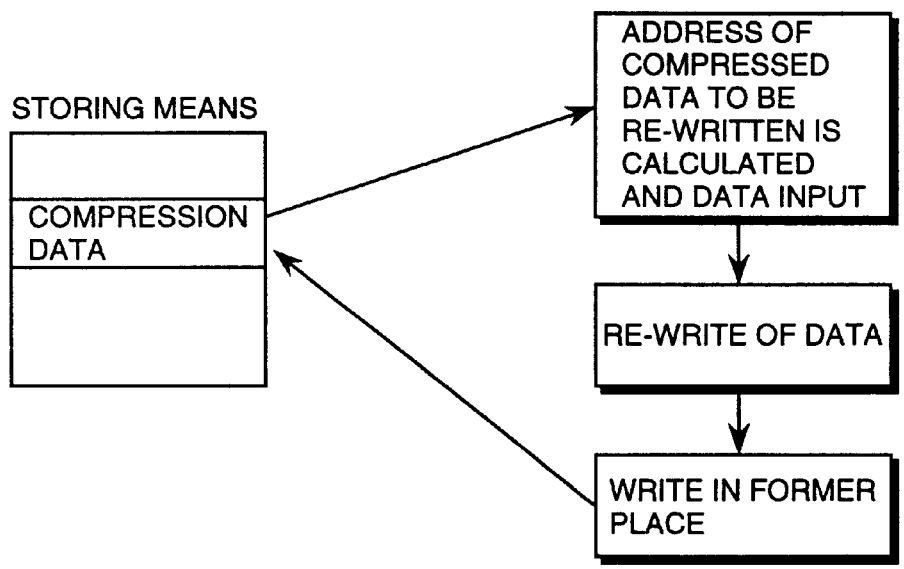

FIGS. 5A an 5B illustrate explains the principle of the editing of the image data, that is, the rewriting of data. As shown in FIG. 5A, if the image data is taken as the image of a manuscript, the image data subject to the rewriting object in a certain specific place is input and re-written for the data, and then the data is written in the former place. On the other hand, in case the compression data stored in the memory is taken, as shown in FIG. 5B, the memory address of the compression data for rewriting must be clear. In addition, the re-written compression data must be stored again in the memory.

Figure 6A:
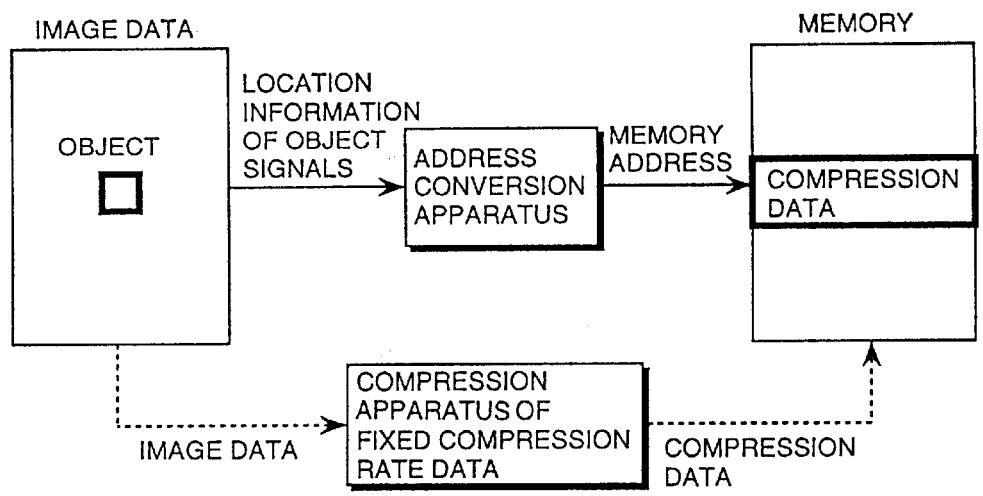
FIG. 6A and FIG. 6B are diagrams which show the memory address of the compression data.
Figure 6B:
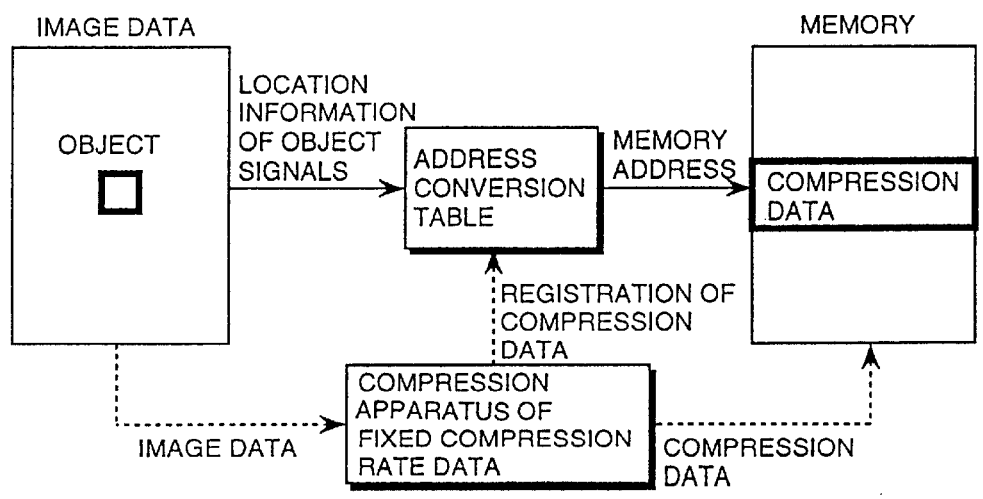
Figure 7A:
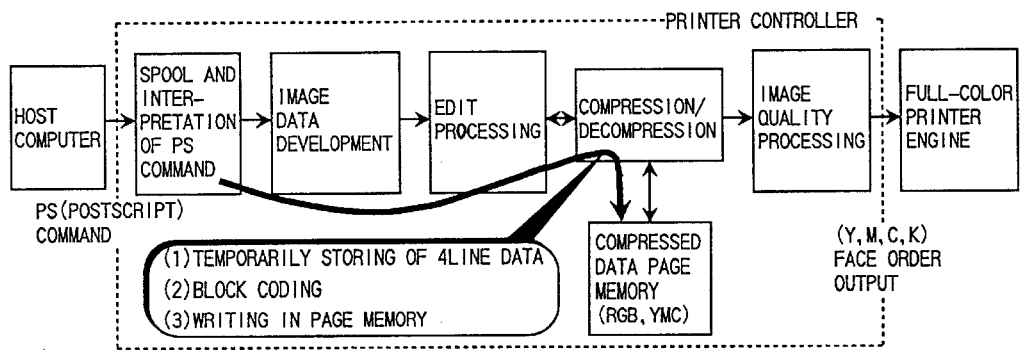
FIGS. 7A to 7F are functional diagrams showing the signal processing of the printer controller.
Figure 7B:
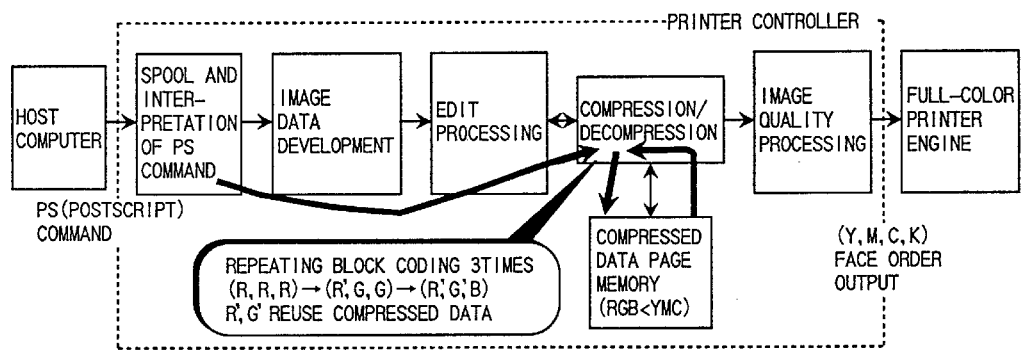
Figure 7C:
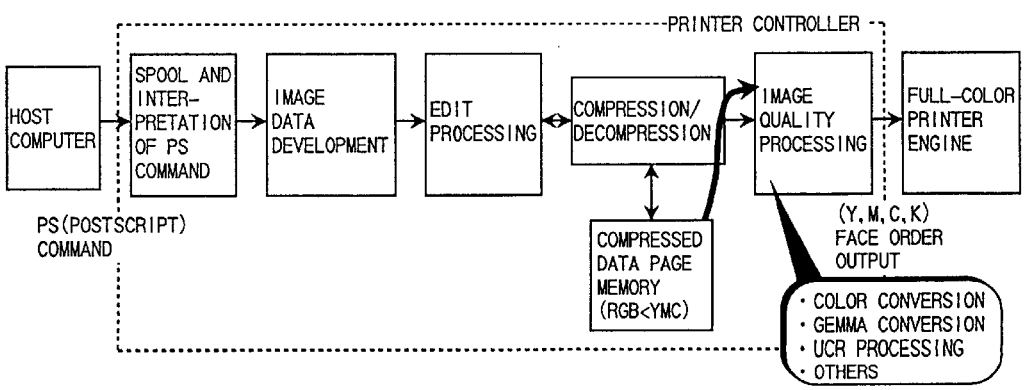
Figure 7D:
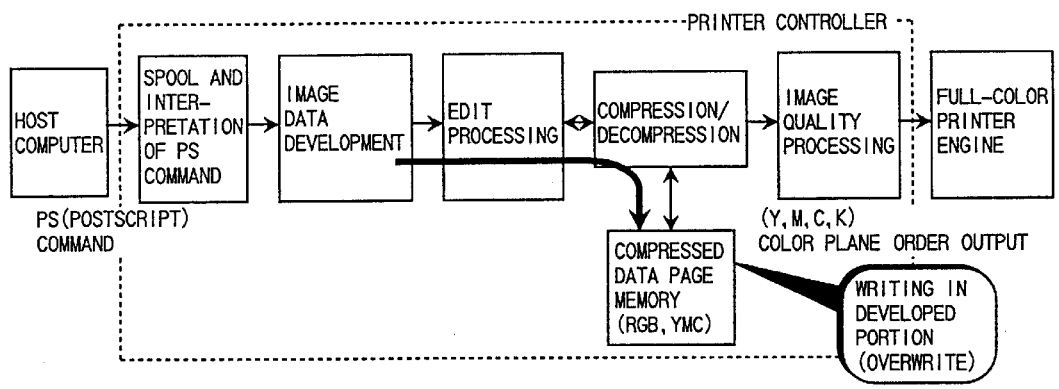
Figure 7E:
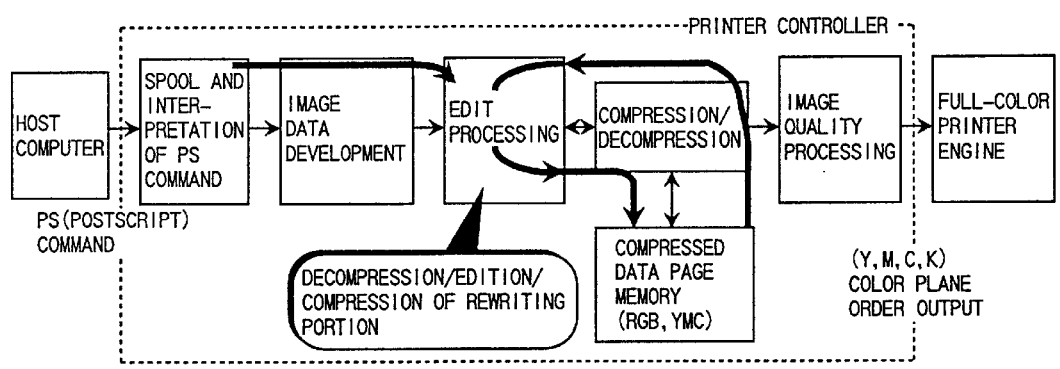
Figure 7F:
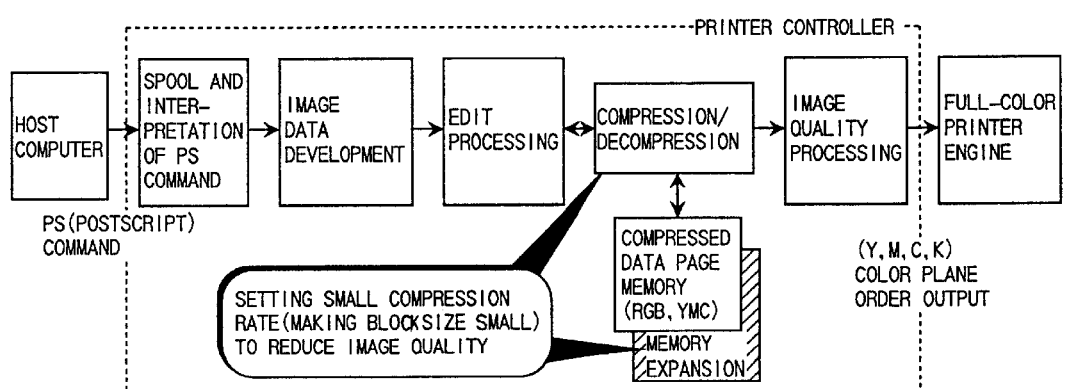

As shown in FIG. 6A, if the compression method employs a fixed compression rate, the compression data to be re-written is read out from the memory, as mentioned above, and the rewritten compression data can be stored again in the former memory area. However, in case of a variable compression rate, as shown in FIG. 6B, the data quantity of the compression data is different by the signal characteristics of the image, which is the object to be compressed, and so information indicating the data quantity is stored at the time of executing the compression processing, and a transformation means for the image location and the memory address must be provided. When means for this transformation is provided, edit processing using the compression data can be realized without depending on the compression method.

Reproducibility of color is one of the picture quality characteristics of a color printer. For example, it is desirable for the same color to be reproduced in the printed result of the display in the same image data. But, since the coloring principles of both are different, signal transformation is indispensable. In case the compression method separates the color signals and the resolution of the image data, signal processing at high speed can be realized by signal conversion only of the compression data relating to the color signal of the former.

And, there is a case in which the reproduction range of the color is limited as apparatus characteristics of the printer. In this case, it is useless to designate a signal outside the reproduction range of the color as a processing object. For example, even if signals outside the reproduction range of the color in the storing means are stored, there is no effect in the printed result, and part of the capacity of the storing means is used needlessly. In such a case, it is desirable to adopt a signal system to remove any signal outside the reproduction range of the color.

FIG. 7A to FIG. 7E show an example of the signal processing of the printer controller described above. On the basis of the command input from the host computer, characters, graphics and color images are developed, and are converted into compression data by using the compression means to store them in the code memory. The compression data is restored by using the decompression means and is output as image data. Then, combining these means, picture quality processing, such as gamma transformation, color transformation, image area separation, UCR (Under Color Reduction), edge emphasis, etc. is carried out. Further, only part of the object is expanded from the compression data stored in the code memory, and edit processing, such as overwrite, rotation, expansion and minification, trimming, etc. is also carried out. This edit processing is executed on the basis of the command input from the host computer as mentioned before.

(a) Edit Processing (re-writing of the image data)

In this case, on the basis of a command input from the host computer, image data, such as characters, graphics and a color image, etc. are written without considering the image data of the background.

(b) Edit Processing (overwriting on the stored image data)

The image data for the background is overwritten on the image data from the host computer. In case the character data is overwritten, for example, the image data for the background in the range where the characters exist is expanded from the memory and the character data is written in every bit. The image data edited like this is compressed again and stored in the memory.

(c) Function Expansion (reduction of the picture quality degradation by memory duplication)

The capacity of the code memory is not limited. The value of the fixed compression rate can be set to be able to store the compression data in the memory on the basis of the memory capacity. Therefore, for the use of a picture quality degradation which is not permissible, the degradation of the picture quality can be reduced by extending the memory capacity and lowering the compression rate employed in the compression method.

The above apparatus construction and the signal processing can provide for simplification of the apparatus construction and the signal processing in case of a fixed compression rate. However, even when the compression method uses a variable compression rate, the effect of the memory cutback can be realized by storing the compression data by employing means for associating the image area with the compression data positions. There are combinations of signal processing and means other than ones shown above. For example, picture quality processing can be processed by the host computer in advance, and the signal processing can be done before edit processing is executed. Based on the basic construction of the present invention like that described above, the effect of the memory cutback can be obtained by storing the compression data.

Figure 8:
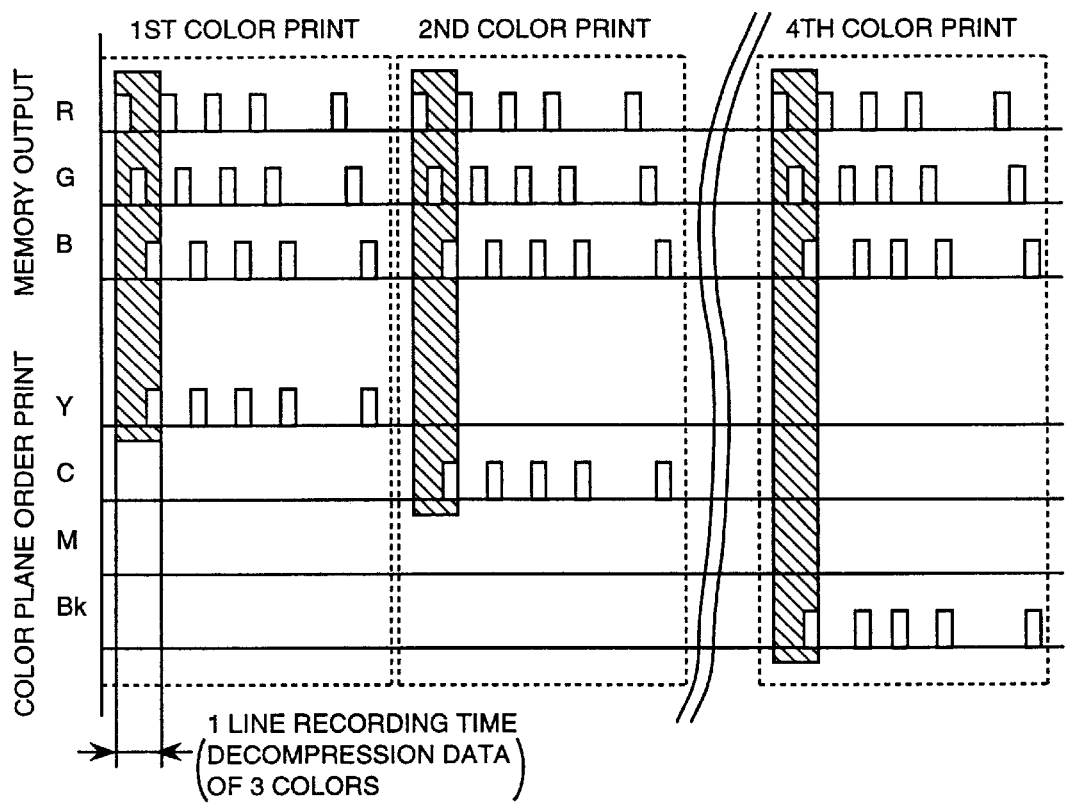
FIG. 8.is a timing chart of signal processing.

FIG. 8 is a timing chart for outputting a color signal on the basis of the coloring principle of a printer engine in accordance with the color order of the printing means. In case the printing means of the printer engine prints each color in the color-plane order, the signals of one line for three colors is taken out from the storing means, and it is output after picture quality processing of the color transformation, etc. using the signal of the three colors, in order to output the signals of one color for one line. In order to improve the picture quality of the printing color, the printer sometimes prints using an ink or toner having a specific spectrum in addition to the three elementary colors. One example is black color (Bk), which is generally called UCR (Under Color Reduction). Since the black color signals are formed from the three elementary color signals by signal processing, the three elementary color signals need to be multiple value signals.

In the example of FIG. 8, when printing four colors (C, M, Y, BK) containing the black color signal, three elementary color signals (R,G,B) stored as compression data are read out from the storing means, and in case where the coding method uses a fixed compression rate wherein signals are output, the data construction of the compression data is understood. Only compression data necessary for the color transformation are designated as the object signals of the color transformation, and so speed-up of signal processing can be realized.

Figure 9:
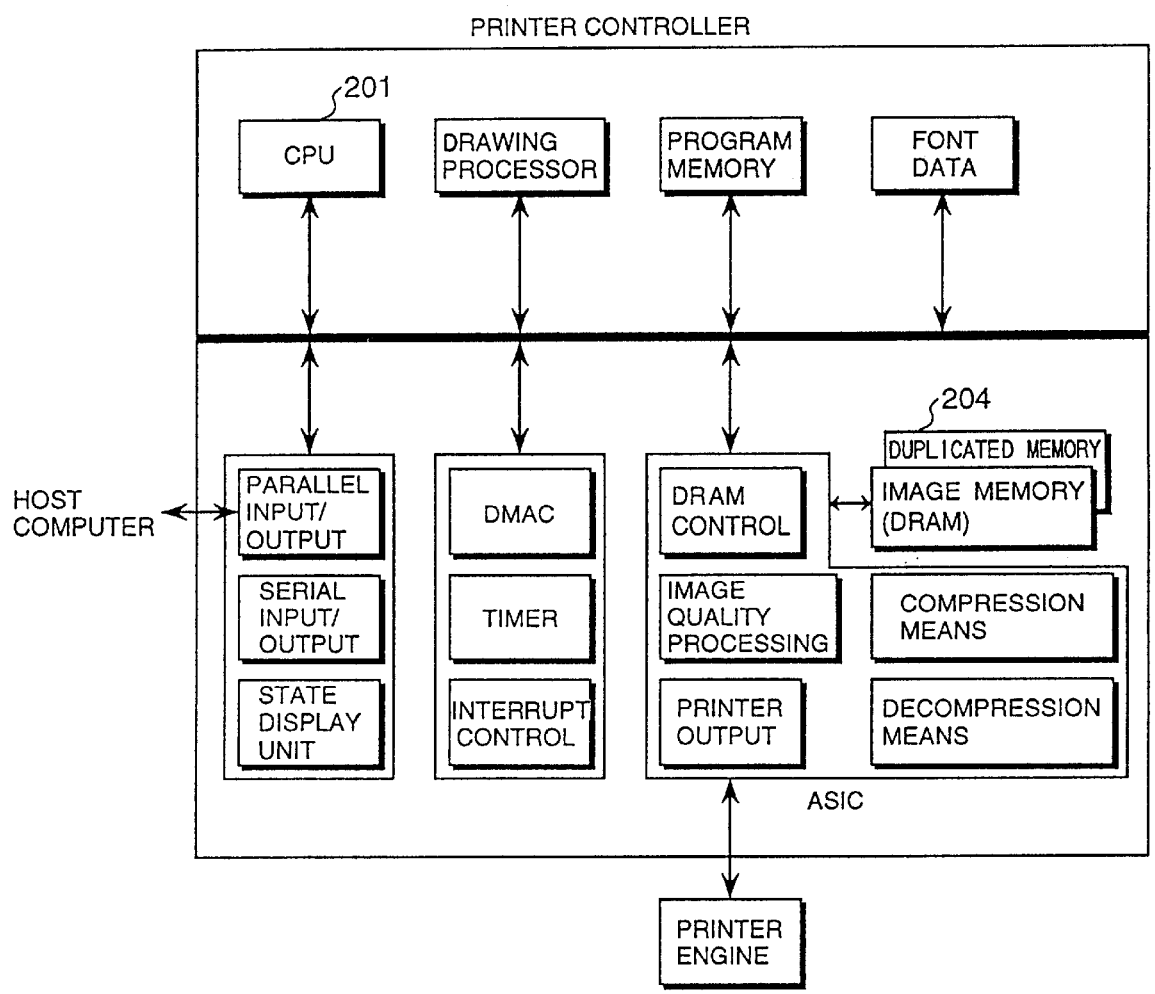
FIG. 9 is a block diagram of an example of the printer controller.

An example of the more detailed apparatus construction of the printer controller is shown in FIG. 9, wherein the apparatus is composed of CPU 201, memory 204, a signal input/output interface, etc., The example shows a construction which can carry out various printer operations. The ability of the printer engine is classified into the categories of black and white two colors, black and white multiple values, multicolor, full-color, etc. While appropriate constructions of the printer controllers are conceivable, it is possible to design the construction of the printer controller such that it can be commonly employed. The compression means and the decompression means can be realized by hardware or signal processing of CPU 201, and several fixed compression rates can be selected on the basis of conditions, such as the picture quality, the resolution and the memory capacity, etc. By this selection, the means for the conditions which are selected by the apparatus itself can be provided from the conditions of the apparatus.

(2) A Display Unit

Figure 10A:
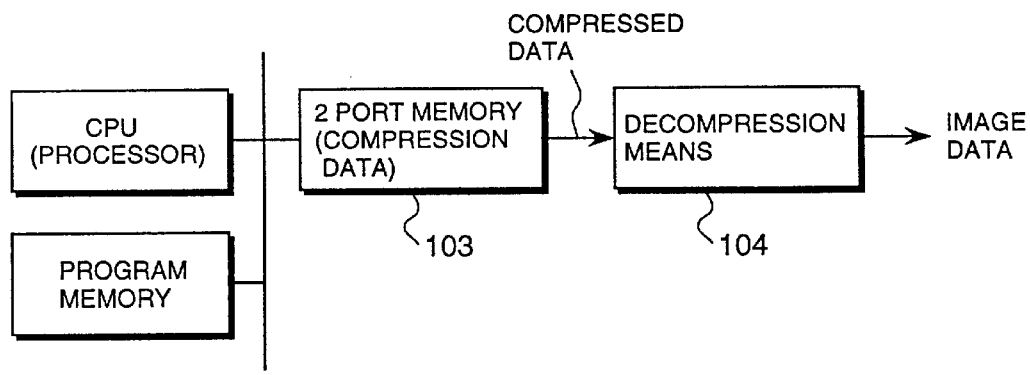
FIG. 10A, FIG. 10B and FIG. 10C are block diagrams showing three constitutional examples of the signal processing equipment for displaying color images, characters, graphs, etc. on a display unit.
Figure 10B:
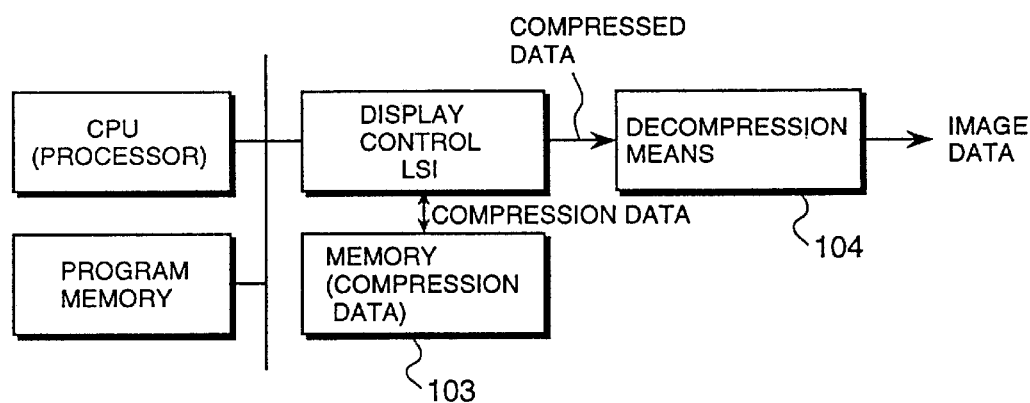
Figure 10C:
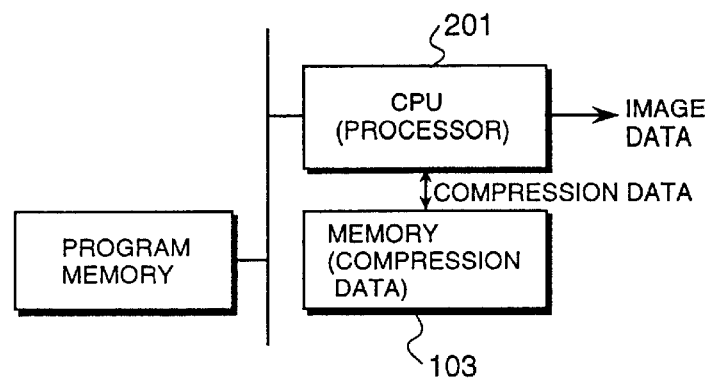

Three examples of the apparatus for displaying a color image, characters, graphs, etc. on a CRT (Cathode Ray Tube), LCD (Liquid Crystal Display), etc. are shown in FIGS. 10A to 10C. In the conventional image displays, the input, format or edited image data are stored in the frame memory in a bit map form, and the data is output according to the scanning order of the display unit. Since the display unit itself does not have a capability for storing the display data, the signals are output from the frame memory at the speed of 30 frames per second, for example.

Problems occur, such as the increase of the memory capacity due to the picture quality improvement, similar to those of the printer controller. Thus, the image data is stored as compression data, and the compression data is decompressed and output step by step according to the scanning order and the display timing of the display unit so that the needed memory capacity can be reduced. According to this feature, the frame memory of the so-called bit map form memory, that is, a memory construction by which the signals of the amplitude range are assigned to every display pixel, is no longer necessary.

FIG. 10A shows a construction wherein a two port memory is used as storing means 103 for the compression data, and the compression data of the memory is restored and output using decompression means 104. The image data to be displayed is generated by CPU 201, and the data is written in memory 103 after converting it into compression data. Thus, the non-compression image data, other than the data output of decompression means 104, is not transmitted to the interface for connecting between the elements. Therefore, the data transmission ability in each interface can be given an allowance.

FIG. 10B shows an example of the apparatus for generating the image data to be displayed by using a display control LSI. CPU 201 conveys the contents to be shown to the display control LSI as a command so that the LSI forms the image data, and the data is stored in the memory (storing means 103) in the form of compression data. Therefore, the non-compression image data and compressed image data are not transmitted to the interface. Allowance of data transmission ability in the interface can be further improved as compared with the case of FIG. 10A.

FIG. 10C shows a construction which is effective for CPU 201 of the high signal processing capacity, wherein CPU 201 generates the image data and stores it in the memory (storing means 103) in the form of compression data. The image data to be displayed is decompressed and output. Since the data transfer between CPU 201 and memory 103 is performed by the compression data, the data transmission ability in the interface can be given an allowance. There are advantages shown in the following when the above apparatus constructions are used.

(a) An image display with no visual degradation can be realized with a small memory capacity.

(b) In the case of a signal output to the display unit of high resolution or frame rate, the data transfer rate from the storing means can be set low.

(c) The data quantity to be written in the storing means is small. Therefore, the overlap of the term for data writing and the term for the data output to the display unit can be reduced.

Further, in case the color reproduction, which is one of the characteristics of the display unit, is corrected by digital signal processing, the correction can be realized by color transformation using the compression data. In the case where the three colors of red, green and blue are represented by signals of 8 bits, for example, when the color transformation is realized by a translation table, a memory with output data of 24 input address lines and 24 bits is necessary. On the other hand, when the color transformation is obtained by calculation on the basis of a transformation expression, rather than by use of a translation table, signal processing corresponding to the translation table for each pixel is necessary. If the signal processing in the state of the compression data of the color signal can be performed, the load imposed by the calculation can be reduced. For example, in case signals in a block composed of several pixels is represented by two kinds of colors and the selection signal showing their difference, the transformation can be carried out by using compression data representing the color which is obtained by this procedure. Therefore, there is no need for decompression of the compression data. Because of a cutback of the data quantity as the object of signal processing, advantages such as speed-up of the processing speed or simplification of the apparatus can be achieved.

In addition, when the coding method uses a fixed compression rate as mentioned above, the data construction of the compression data becomes clear, and when the input or the formation of the image data is executed in the form of compression data, the data writing into the storing means can be executed without carrying out signal processing by the compression means.

(3) A Filing Apparatus

Figure 11A:
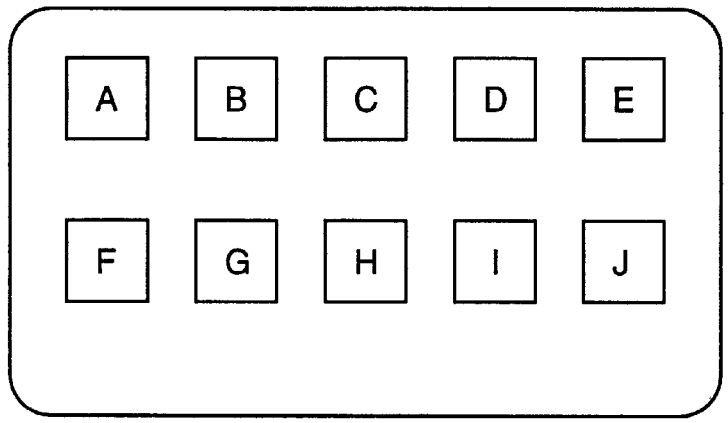
FIG. 11A shows an example of the screen of a filing apparatus.

It is one of the functions required for the filing apparatus to retrieve data at high speed and display the image data which is stored in a large capacity file and converted into compression data. In order to certainly and quickly find the desired image data, a retrieval using only a keyword, etc. is not sufficient. It is desirable that the corresponding image shown in FIG. 11A is approximately displayed. For this purpose, the image data of all image planes are sub-sampled for the purpose of displaying image data of all image planes at minification. When the corresponding image data is sub-sampled after all the data has been developed, the necessary memory capacity will become huge, and high speed decompression processing of the compression data and subsampling processing for a large quantity of data become necessary.

Figure 11B:
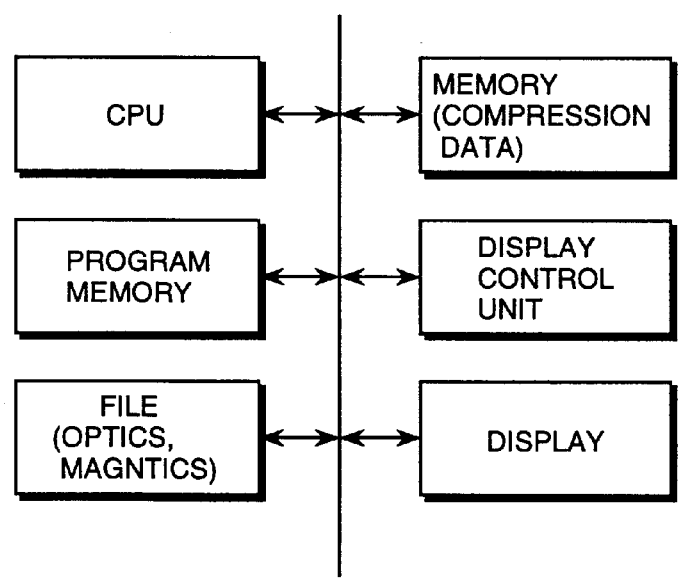
FIG. 11B is a block diagram of an example of the filing apparatus.

Then, the apparatus construction of the present invention shown in FIG. 11B can be applied. The image data input from an external large capacity file is stored in the compression state in the storing means, and the subsampling of the compression data is carried out, and the data is restored to the image data and displayed. Since the compression data constitution is understood in advance by the coding method using a fixed compression rate, the subsampling is easily conducted without expanding, and it is also possible to set the ratio of the subsampling corresponding to the minified magnification of the display. Several outline image planes are displayed simultaneously by displaying only similar color signals taken out from the block, as shown in FIG. 11A, so that the data can be retrieved and displayed at high speed.

Further, edit processing for the image data stored can be carried out easily, as was described above. In the case of a fixed compression rate, since the rotation of the image plane and the minification are easy, the edit function, such as reducing the size of the A4 size by putting two pages side by side to output it as an A4 size plane, which is provided with the copying machine, etc. can be carried out easily.

(4) LSI

In general, means for calculating and processing signals and means for storing signals are realized as different entities, and both are connected by data transfer means. As an embodiment, a CPU (Central Processing Unit) or specified LSI is used for calculating processing, and a semiconductor memory or optical or storing means, based on an optical or magnetic principle, is used for signal storing, and electric wiring is used for data transmission.

There are also problems in the constitution of these means stemming from the desire for picture quality improvement. That is, there is an increase of the memory cost and the signal processing time, an increase of the data transfer time, etc. However, execution of the data transfer between the means in the form of compression data is effective for solving these problems.

Figure 12A:
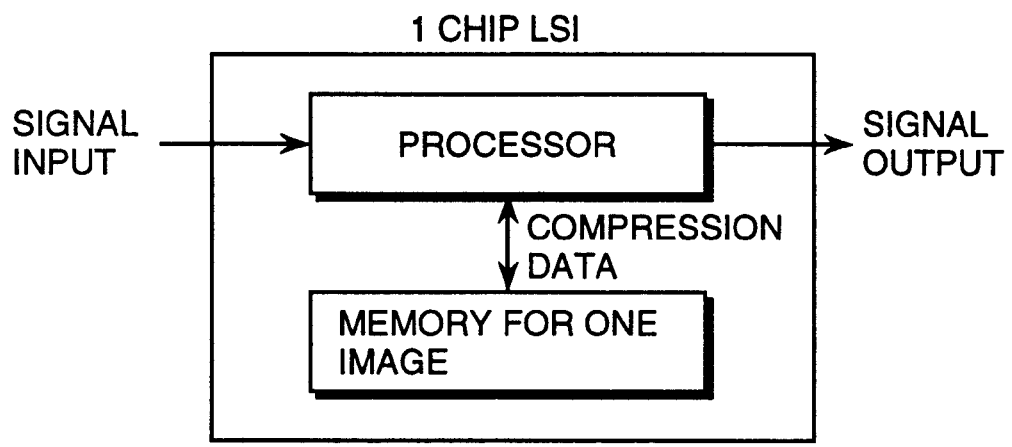
FIG. 12A and FIG. 12B are block diagrams showing examples of a one chip LSI.
Figure 12B:
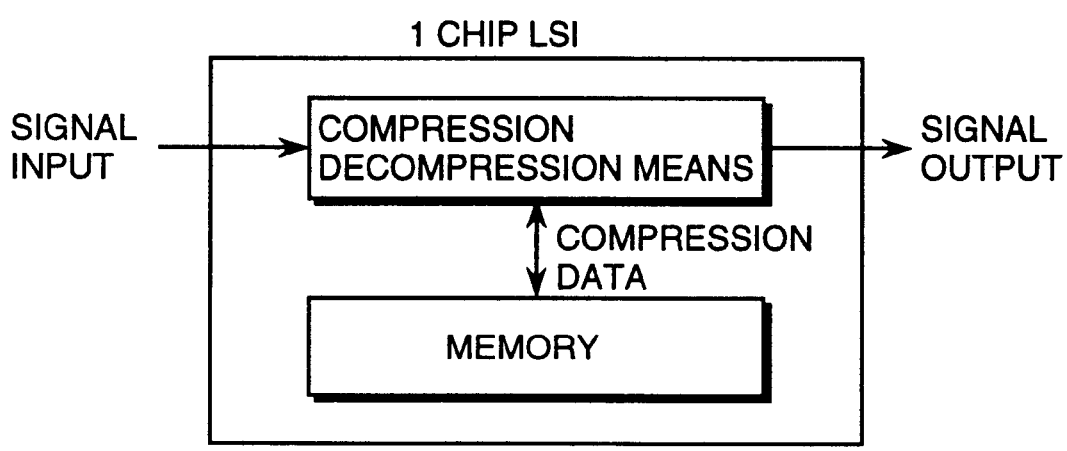

Next, due to the progress of LSI technology, unification of the calculation and processing means and the signal storing means was realized so that the present invention could be applied to the case of a so-called one chip device. As shown in FIG. 12A, for example, if the memory for storing the image data for one image plane is united with the calculation and processing means on one chip, the apparatus constitution of which the image data at the time of processing closed in one chip LSI is realized. The processing object is not limited to a two-dimensional plane image. There are the same advantages in an animation image having a time factor, image planes related to multidimensional spaces, etc. as mentioned above. Further, as shown in FIG. 12B, if the compression and the decompression means are built in the memory chip for the storing means, the memory chip can be dealt with as a memory chip of large memory capacity by the rate of the compressibility. For realizing high speed signal input/output processing, as cache memory is built in.

(5) Game Instrument

In general, the instrument which carries out image formation, editing and display data on the basis of an interactive procedure is called a TV game instrument, and signal processing is carried out at the same rate of the animation image. Here, the point different from the foregoing example of the apparatus is that means for the formation and procedure of the image formation is built in. Therefore, for the purpose of the compression of the image data, the image formation can be carried out based on the form of the compression data at the step of the formation of the image.

Figure 13:
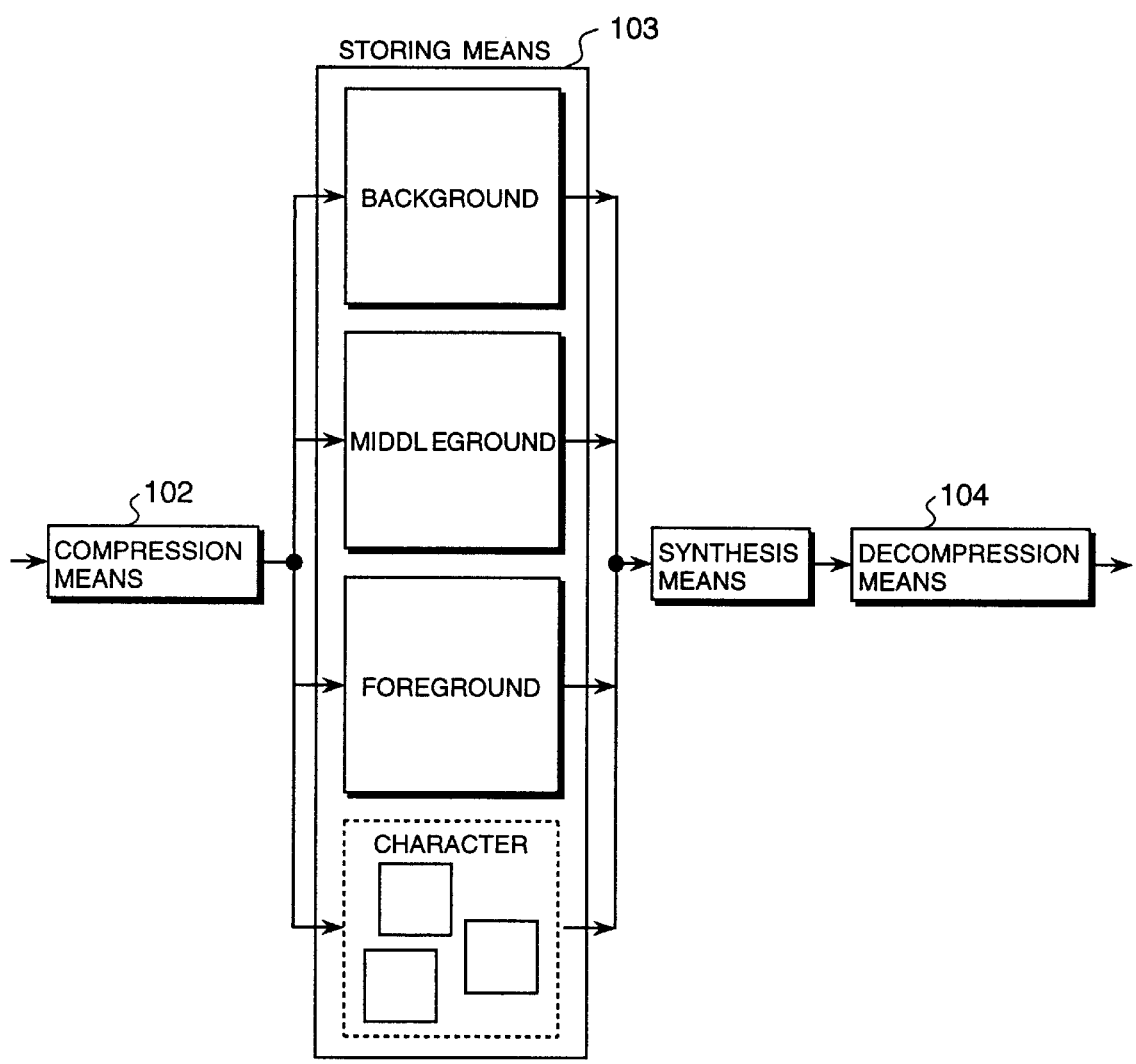
FIG. 13 is a block diagram of an example of the construction of the game instrument and shows the storing means in detail.

As shown in FIG. 13, the image data can be separated into a background, a middleground, a foreground, characters, etc. on the basis of the elements of the image plane, and the constitutions of compression means 102, storing means 103 and decompression means 104 can be set on the basis of the characteristics which are different, respectively. For example, a relatively high compression rate can be set in the case where a certain degradation of the picture quality in the background is permitted. While the degradation of picture quality is not permitted for a noticed character, the maximum image plane size can be set small to produce non-compressed image data. The parallel transfer of the background image plane can be carried out by modifying the address for reading out the compression data.

For the data compression of the color image plane, for example, in case the signals in the block composed of several pixels are represented by selection signals for two kinds of colors and their difference, it is easy to carry out the image formation in the form of compression data by this procedure. Several kinds of colors representing the inside of the block are determined, and the allocation in the block of the set colors is determined. The size of this block is not always fixed, but can be set at the external form of a body to be displayed. There are advantages shown in the following.

(a) The color signals should be generated at every block unit.

That is, because it is not necessary to generate the color signals of each pixel, the processing speed can be increased.

(b) Because the compression means is not always equipped as another element, the apparatus construction can be simplified.

Figure 14A:
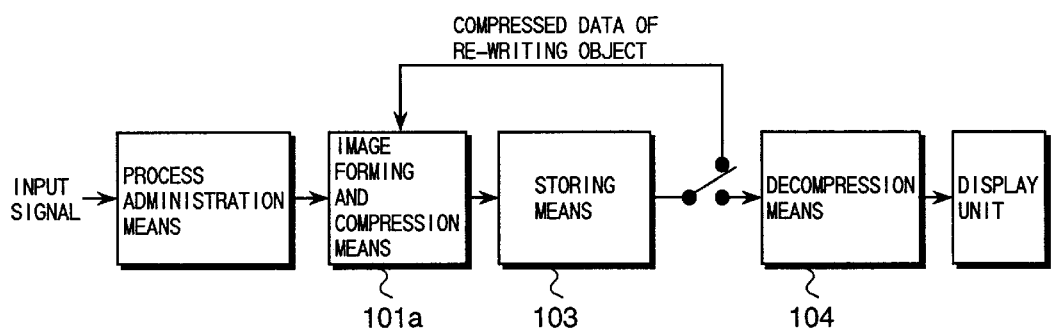
FIG. 14A and FIG. 14B are block diagrams of examples of the basic construction of the image display unit of the game instrument.
Figure 14B:
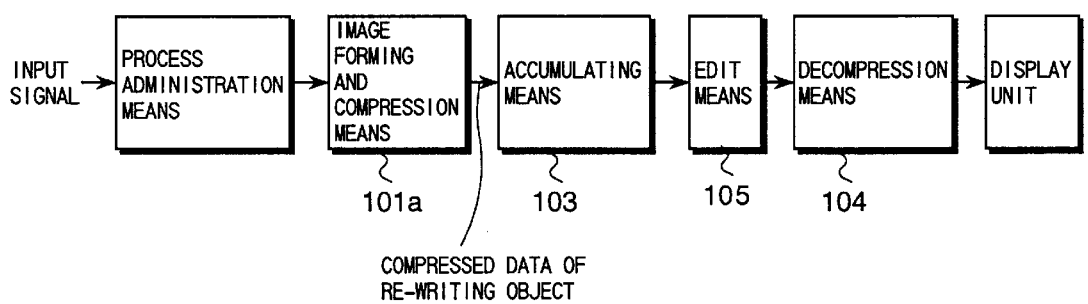

(c) Because the image data is handled by the compressed format except for the data output to the display means, the transfer speed of data can be set low. In addition, signal processing of high speed is possible because only rewriting the object of the image can be edited. Two basic constitutions for realizing these features are shown in FIG. 14A and FIG. 14B. Since the initial value of the compression data, the signals representing the maximum value, the minimum value, any signal level or any color of the amplitude range of the signals has only to be written in the storing means in advance, the data value can be directly written in the storing means without operating the compression means.

(6) Converter of the External Input Signal

The signals input from the outside are input through. the transmission means on the basis of some communication protocol or the storing means, etc. on the basis of the optical or magnetic principle as compression data or non-compression data. The compressed data can be restored by the decompression means and converted into compression data by the corresponding compression means used in the present invention.

When the compression data input from the outside is not restored at one time, but is restored step by step, the capacity of the means for storing the restored signals can be made small. Further, when the signals input from the outside are the image data, a means for judging the input order, etc. of the pixels and the kind of colors that constitute the data in advance is provided. For example, the following judgments are made.

(a) The header information added to the head of the data is judged.

(b) The specific marker cord (showing the paragraph of the plane) for the compression data of the variable compression rate is retrieved and the face of the color image is divided.

(7) Program Compression Equipment

In the explanation of the above example, the same effects can be obtained by applying the present invention to ripple data such as audio, character codes, etc., without limiting the image data of the signals.

For example, in the apparatus construction using a processor for executing the calculation, data transfer, etc. based on a program, when the program is stored as compression data and when the decompression processing is executed in the processor core, the following are achieved.

(a) The capacity of the program storing memory is reduced.

(b) The data transfer quantity between the processor and the program storing memory can be reduced.

Figure 15A:
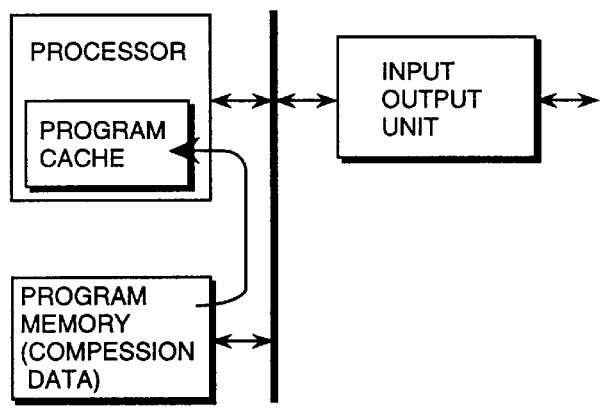
FIG. 15A is a block diagram of an example of the program compression equipment.

An example of the apparatus is shown in FIG. 15A. Because it is impossible to directly refer to the absolute address of the program in case of a variable compression rate, the following measures are needed.

(a) The data is decompressed in advance in the cache memory, etc.

(b) Means for adding indexes to refer to the absolute address for every program step becomes necessary.

Figure 15B:
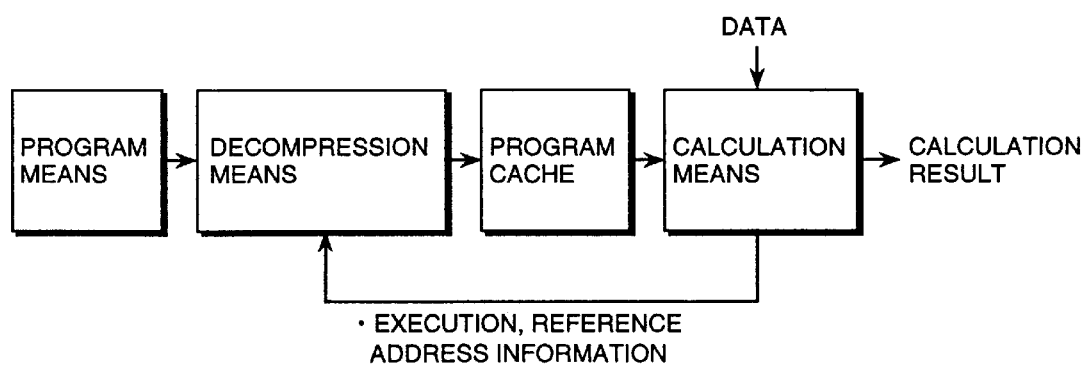
FIG. 15B is a block diagram of an example of the signal procedure of the program compression equipment.

An example of the procedure for signal processing by the apparatus of FIG. 15A is shown in FIG. 15B.

(8) Multiple Media Apparatus

Figure 16:
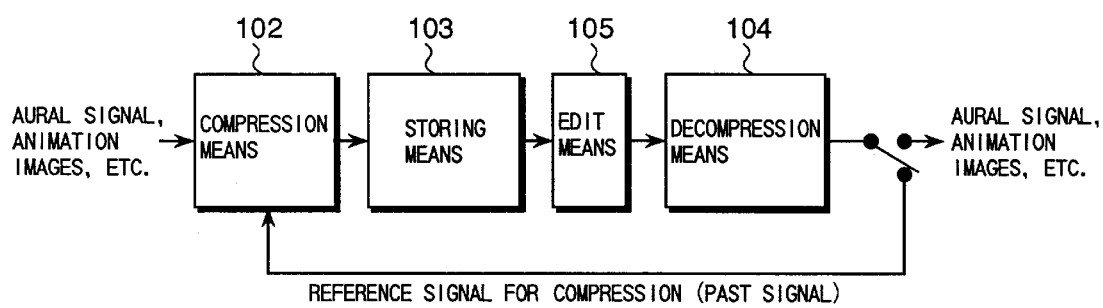
FIG. 16 is a block diagram of the multimedia apparatus.

The present invention can be applied to constitute an apparatus for inputting, storing, forming, editing and storing several signals of different characteristics. The present invention is applied to signals having correlativity in the time base direction, such as audio signals, animation images, etc., as shown in FIG. 16. Since compression means 102 can compress signals by using signal correlativity in the time base direction, the effective compression can be carried out by referring to past signals. Then, only signals to be referred to for compression processing are restored and can be used by edit means 105, if the past data to be referred to is stored in storing means 103 as compression data. Similar to the above, when the compression data is decompressed by decompression means 104, the past signals also can be referred to.

(9) Compression means of the color image

Figure 17:
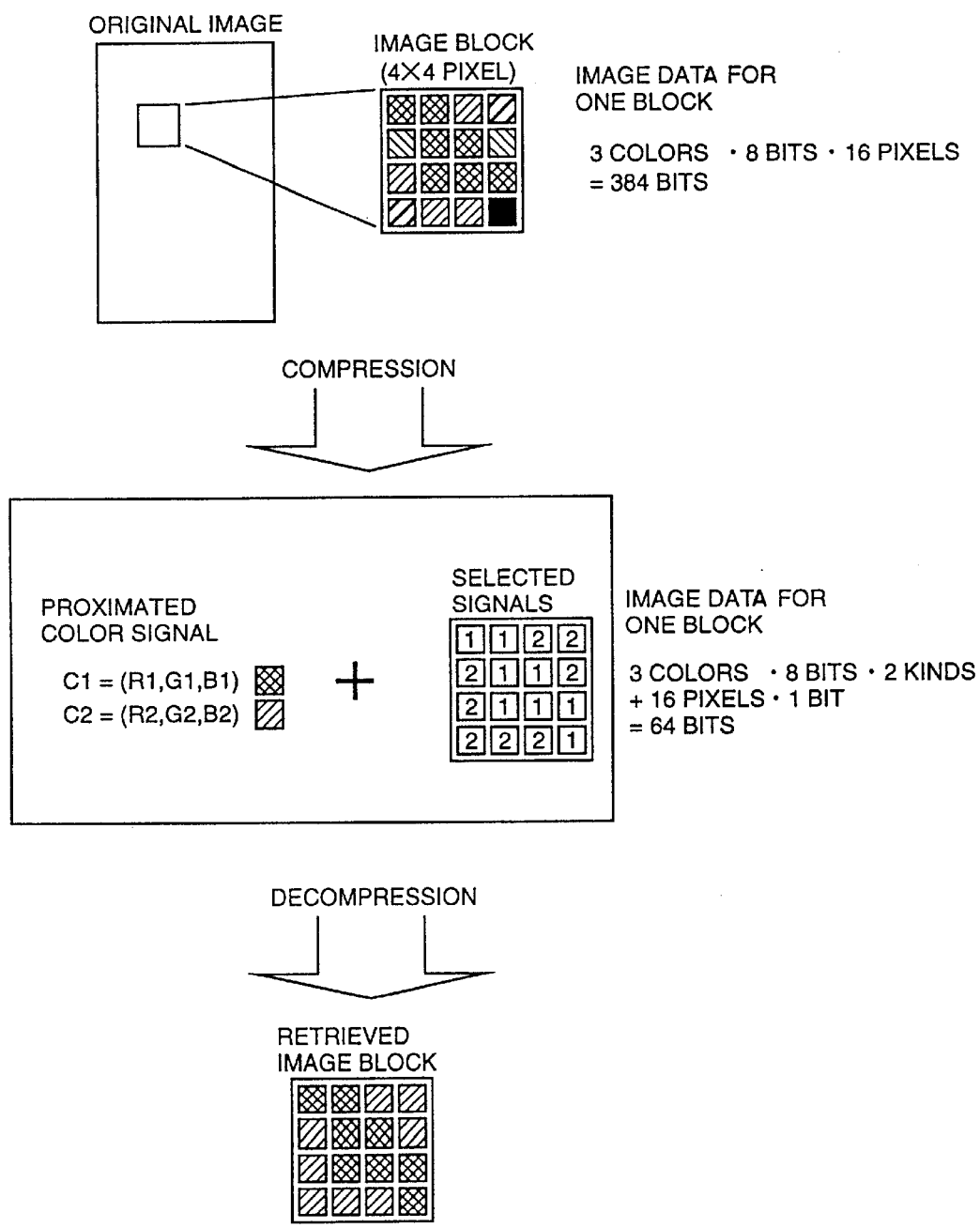
FIG. 17 is a processing flow diagram of the method of compression of a color image.

An example of the compression method of the means for compressing the color image is shown in FIG. 17. Colors generated in the blocks (color decided by combination of the three elementary color signals) are limited to about two colors and are approximated as one block of several adjacent pixels from the image data. Then, the selected result of the limited color is created about each pixel in the block. Therefore, if three colors (for example, RGB; red, green and blue) are each represented by an 8 bit signal for 16 pixels of the block size, 384 bits are necessary for the original data. When approximating the colors to two colors, the data can be compressed to 64 bits which is ⅙. In this way, the visual degradation. of the picture quality is hardly recognized by limiting the kinds of colors generated in the small areas.

The compression rate achieved by this means does not depend on the characteristics of the image data of the signals. The compression data can be differentiated to the signals representing the kinds of the colors and the signal representing the selection result of the color of each pixel. Therefore, in order to transform colors, it is enough to use signal-processing of the compression data of the former, and to use signal-processing such as the minification of the rotation and expansion, etc. for the latter. In order to rewrite a part of the image data, only compression data corresponding to the place in the image need be rewritten.

The block size can be made adjustable, and the value of the fixed compression rate changes in accordance with the set size. Therefore, on the basis of the storing capacity (memory capacity) of the storing means, the block size is set to set the compression rate so as to be able to store the compression data in the memory.

As mentioned above, the signal processing equipment of the present invention reduces the capacity of the memory for storing the image data, and the data transfer rate among means is increased. Further, the formation and the editing of the image data can be executed at high speed. The present invention is suitable for signal processing equipment which operates to print and display an image.

What is claimed is:

1. A signal processing equipment, comprising:
   compression means for converting an input signal into compressed data being compressed at a fixed compression rate,
   wherein said compression means comprises:
   means for dividing said input signal of a color image, where plural pixels are represented by plural color signals, into a plurality of blocks each being composed of a predetermined number of pixels,
   means for calculating approximated color signals based on said plural color signals in said block, and
   means for selecting an approximated color signal corresponding to a color signal of each pixel in said block and outputting selected approximated color signals for each block as said compressed data;
   a memory which stores said compressed data;
   a processor which reads stored compressed data from said memory; and
   decompression means for decompressing said compressed data from said processor,
   wherein said processor reads compressed data from said memory and causes said decompression means to decompress said compressed data from said processor in synchronism with a timing of outputting decompressed data from said decompression means to an output device, and
   wherein said processor reads said compressed data from said memory, rewrites a part of said compressed data, and stores the rewritten compressed data to said memory.

2. The signal processing equipment according to claim 1, wherein said fixed compression rate can be set according to capacity of said memory.

3. A signal processing equipment, comprising:
   compression means for converting an input signal into compressed data being compressed at a fixed compression rate,
   wherein said compression means comprises:
   means for dividing said input signal of a color image, where plural pixels are represented by plural color signals, into a plurality of blocks each being composed of a predetermined number of pixels,
means for calculating approximated color signals based on said plural color signals in said block, and
means for selecting an approximated color signal corresponding to a color signal of each pixel in said block and outputting selected approximated color signals for each block as said compressed data;
a memory for storing compressed data;
a display which displays decompressed data;
a processor which reads compressed data from said memory; and
decompression means for decompressing said compressed data from said processor,
wherein said processor reads said compressed data from said memory, causes said decompression means to decompress compressed data from said processor in synchronism with a scanning order and a display timing of said display and to output decompressed data to said display according to said display timing of said display, and
wherein said processor reads said compressed data from said memory, rewrites a part of said compressed data, and stores the rewritten compressed data to said memory.

4. A signal processing equipment, comprising:

storing means for storing compressed data, wherein said compressed data is generated according to the steps of:
dividing an input signal to a plurality of blocks each being composed of a predetermined number of pixels, and said input signal being composed of a plurality of pixels having a plurality of color signals,
calculating approximated color signals based on said plurality of color signals in said block,
approximating said plurality of color signals in said block to said calculated approximated color signals,
selecting said approximated color signals corresponding to a color signal of each pixels in said block, and
converting said compressed data into said calculated approximated color signals and said selected result of said approximated color signals; and
decompression means for converting a decompressed data into said compressed data,
wherein said decompression means reads said compressed data from said storing means and converts said compressed data into decompressed data in synchronism with a timing of outputting said decompressed data from said decompression means to an output device, and
wherein said processor reads said compressed data from said memory, rewrites a part of said compressed data, and stores the rewritten compressed data to said memory.

5. A signal processing equipment, comprising:

compression means for converting an input signal into compressed data being compressed at a fixed compression rate, wherein said compression means comprises:
means for dividing said input signal to a color image, where plural pixels are represented by plural color signals, into a plurality of blocks each being composed of a predetermined number of pixels,
means for calculating approximated color signals based on said plural color signals in said block, and
means for selecting said approximated color signals corresponding to a color signal of each pixel in said block and outputting selected approximated color signals for each block as said compressed data;
a memory which stores said compressed data;
a processor which reads stored compressed data from said memory; and
decompression means for decompressing said compressed data from said processor,
wherein said processor reads compressed data from said memory and causes said decompression means to decompress said compressed data from said processor in synchronism with a timing of outputting decompressed data from said decompression means to an output device, and
wherein said processor reads out compressed data for rewriting from said memory, calculates an addressing said memory to which rewritten compressed data is to be stored, rewrites said compressed data, and stores the rewritten compressed data into said memory at the calculated address.

6. A signal processing equipment, comprising:

compression means for converting an input signal into compressed data being compressed data fixed compression rate, wherein said compression means comprises:
means for dividing said input signal to a color image, where plural pixels are represented by plural color signals, into a plurality of blocks each being composed of a predetermined number of pixels,
means for calculating approximated color signals based on said plural color signals in said block, and
means for selecting an approximated color signals corresponding to a color signal of each pixel in said block and outputting selected approximated color signals for each block as said compressed data;
a memory which stores said compressed data;
a display which displays decompressed data;
a processor which reads stored compressed data from said memory; and
decompression :means for decompressing said compressed data from said processor,
wherein said processor reads said compressed data from said memory, causes said decompression means to decompress said compressed data from said processor in synchronism with a scanning order and a display timing of said display and to output decompressed data to said display according to said display timing of said display, and
wherein said processor reads out compressed data for rewriting from said memory, calculates an address in said memory to which rewritten compressed data is to be stored, rewrites said compressed data, and stores the rewritten compressed data into said memory at the calculated address.

7. A signal processing equipment, comprising:

storing means for storing compressed data, wherein said compressed data is generated according to the steps of:
dividing an input signal to a plurality of blocks each being composed of a predetermined number of pixels, and said input signal being composed of a plurality of pixels having a plurality of color signals,
calculating approximated color signals based on said plurality of color signals in said block,
approximating said plurality of color signals in said block to said calculated approximated color signals, selecting said approximated color signals corresponding to a color signal of each pixel in said block, and converting said compressed data into said calculated approximated color signals and said selected result of said approximated color signals; and decompression. means for converting a decompressed data into said compressed data, wherein said decompression means read said compressed data from said storing means and converts said compressed data into decompressed data in synchronism with a timing of outputting said decompressed data from said decompression means to an output device, and wherein said processor reads out compressed data for rewriting from said memory, calculates an address in said memory to which rewritten compressed data is to be stored, rewrites said compressed data, and stores the rewritten compressed data into said memory at the calculated address.

\* \* \* \* \*